(12) United States Patent
Shum et al.

(10) Patent No.: US 6,674,907 B1
(45) Date of Patent: Jan. 6, 2004

(54) COLOR IMAGE QUANTIZATION USING A HIERARCHICAL COLOR PERCEPTION MODEL

(75) Inventors: Heung-Yeung Shum, Beijing (CN); Wei-Jun Chen, Shanghai (CN)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/506,148

(22) Filed: Feb. 17, 2000

(51) Int. Cl.[7] .................................................. G06K 9/62
(52) U.S. Cl. ........................ 382/225; 382/164; 382/166
(58) Field of Search .................................. 382/225, 164, 382/180, 227, 251–253, 173, 166

(56) References Cited

U.S. PATENT DOCUMENTS 5,047,842 A * 9/1991 Bouman et al. ............. 358/515
5,519,789 A * 5/1996 Etoh .......................... 382/225

OTHER PUBLICATIONS

Ikonomkais et al. "Region Growing an Region Merging ImageSegmentation." IEEE, Digital Signal Processing Proceedings, v. 1 1997, 299–302.*
Velho et al. "Color Image Quantization by Pairwise Clustering." IEEE, Computer Graphics and Image Processing, 1997, 203–210.*
Wan et al. "A New Approach to Image Retrieval with Hierarchical Color Clusterin." IEEE, Circuits and Ssytems for Vidoe Technology, v. 8, 1998, 628–643.*
Celenk. "Hierarchical Color Clustering for Segmentation of Textured Images." IEEE, Systems Theory, 1997, 483–487.*
Ikonomakis et al. "A Region–Based Color Image Segmentation Scheme". SPIE Conference on Visual Communications and Image Processing, vol. 3653, Jan. 1999, pp. 1202–1209.*

KM Kim et al, Color image quantization using weighted distortion message of HVS color activity, Proc. of ICIP, vol. 3, pp. 1035–1039 (1996).

WS Kim et al, Color image palette construction based on the HIS color system for minimizing the reconstruction error, Proc. of ICIP, vol. 3, pp. 1041–1044 (1996).

P. Scheunders, A genetic approach towards optimal image quantization, Proc. of ICIP, vol. 3, pp. 1031–1034 (1996).

N. Chaddha et al, Color quantization of images based on human vision perception, Proc of ICASSP, vol. 5, pp. 89–92, 1994.

D. Comaniciu, P. Meer, Robust analysis of feature spaces: color image segmentation, Proc of CVPR, pp. 750–755, 1997.

Y. Deng et al, Peer Group Filtering and Perceptual Color Image Quantization, Proc of IEEE Int'l Symposium on Circuits and Systems (ISCAS), vol. 4, pp. 21–24, 1999.

X. Wu, Color quantization by dynamic programming and principal analysis, in ACM Transactions on Graphics, vol. 11, No. 4, Oct. 1992, pp. 348–372.

* cited by examiner

*Primary Examiner*—Amelia M. Au
*Assistant Examiner*—Colin LaRose
(74) *Attorney, Agent, or Firm*—Lyon & Harr, LLP; Richard T. Lyon

(57) ABSTRACT

Color image quantization using a hierarchical perceptual color model is disclosed. In one embodiment, a method constructs a clustering space of an image having a number of pixels, based on a color perception model. The clustering space includes a number of significant pixels, where each of the significant pixels does not have a parent pixel within the clustering space. The colors of the image are quantized based on these significant pixels. The remaining pixels have their colors mapped to one of the quantized colors.

16 Claims, 13 Drawing Sheets

COLOR IMAGE QUANTIZATION USING A HIERARCHICAL COLOR PERCEPTION MODEL

FIELD OF THE INVENTION

This invention relates generally to color image quantization, and more particularly to such quantization using a hierarchical color perception model.

BACKGROUND OF THE INVENTION

Color images, such as those captured using a digital video camera, a capture device for an analog video camera, a digital camera, or a scanner for existing photos, typically have a multitude of colors. For example, an image that is captured using a 24-bit color depth can have up to $2^{24}$ different colors. While this makes for a very realistic image, the vast number of colors in the image means that the image takes up a lot of memory, which is inconvenient for storage and transmission purposes. Furthermore, applications such as computer vision (and image understanding) applications have difficulty understanding the perceptual objects (e.g., a person in a photo, a tree in the photo, etc.) that make up an image when there are so many colors in the image.

Therefore, color image quantization reduces the number of colors in an image to a predetermined number, such as only sixteen, as one example. It does this by determining an appropriate palette, or table, of a reduced number of colors, and then mapping the color of each pixel to a color from the palette, typically to the palette color that is closest to the original color of the pixel. In this way, the storage size of the image is effectively compressed, since far less data is needed to describe the colors of the image. An added advantage is that applications such as computer vision applications may then have an easier time understanding the objects that make up an image, where the objects each have fairly distinct color boundaries from one another.

Generally, color image quantization approaches within the prior art achieve a similarity between the source image and the quantized image based on the intensity difference between the two images, or based on another pixel-based measurement, such as a color histogram. However, such approaches do not provide higher-level information, such as the spatial connectivity among pixels, which is necessary for applications such as image segmentation and object recognition. While some approaches do take into account some of the spatial distribution among the colors of the images, they still usually do not provide enough higher-level information that is required in computer vision and other applications.

For these and other reasons, therefore, there is a need for the present invention.

SUMMARY OF THE INVENTION

The invention relates to color image quantization using a hierarchical perceptual color model. In one embodiment, a method constructs a clustering space of an image made up of a number of pixels, based on a color perception model. The clustering space includes a number of significant pixels, such that each of the significant pixels does not have a parent pixel within the clustering space, while the hierarchically lesser remaining pixels have at least one parent that is a significant pixel. The colors of the image are then quantized based on these significant pixels. Each of the remaining pixels then has its colors mapped to one of the quantized colors.

In one particular embodiment, constructing the clustering space of the image involves growing a perceptible color region, such as a disk, for each pixel, and building a relationship graph of hierarchical parent-child relationships of the pixels based on these perceptible color regions. A perceptible color region in one particular embodiment is grown by using a multi-scale edges approach. The relationship graph in one particular embodiment is built for each pair of overlapping regions by determining which region has a greater size, such that the region which has the greater size is the parent, and the region having the lesser size is the child.

Embodiments of the invention provide for advantages not found within the prior art. A color quantized image according to an embodiment of the invention has its colors chosen based on the non-overlapping perceptible color regions. Because these regions are themselves grown based on a color perception model, this means that the colors that are selected are comparable to what is visually significant to a human. Thus, inasmuch as colors are useful in determining the boundaries among objects within the image, quantizing the image according to colors selected based on a color perception model means that the resulting color quantized image yields useful higher-level information for computer vision and other applications.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
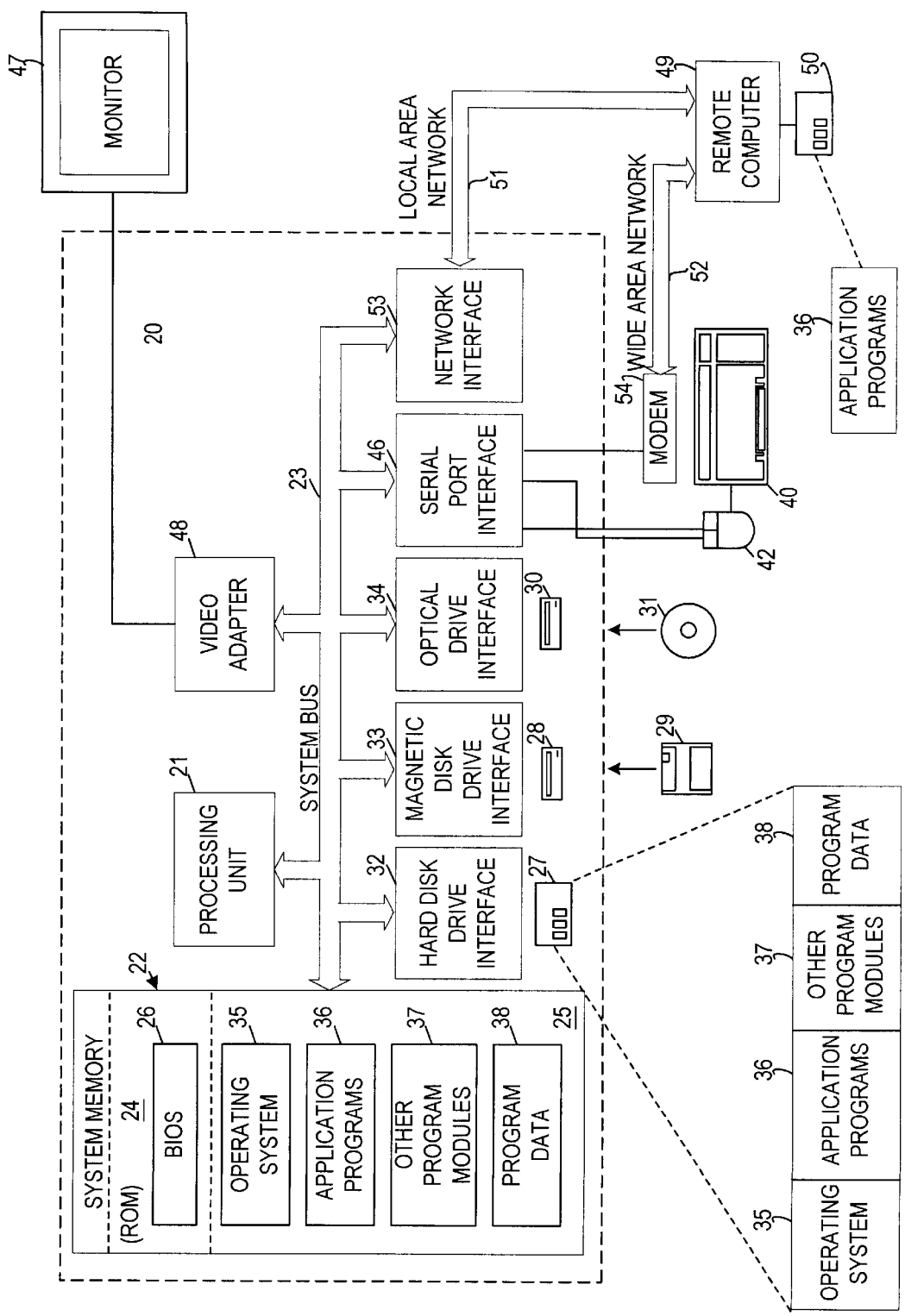
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Overview

Embodiments of the invention are based on a hierarchical perception model. This hierarchical perception model is generally described in this section of the detailed description. Perceptible regions of pixels and relationship graphs are also introduced in this section of the detailed description, as well as the overall approach that can be used in accordance with an embodiment of the invention to perform color image quantization using a hierarchical perception model. Subsequent sections of the detailed description provide the manner by which each part of the overall approach can be carried out, according to an embodiment of the invention.

Thus, it is first noted that human perception does not come from observing a single pixel within an image, but rather from observing differences between a pixel and its neighbor. Embodiments of the invention therefore consider local information of each pixel by grouping its neighbors in a region such as disk. A perceptual region is non-restrictively defined herein as a region that has homogenous feature vectors, such as color vectors, from a perceptual perspective, specifically from a human perceptual perspective. Local information of each pixel is considered by grouping its neighbors in a region such as a circular disk.

Pixels are more specifically non-restrictively referred to as homogenous if the feature difference among them within the perceptible region is less than a predetermined minimum difference, corresponding in one embodiment to the minimum difference that a human can perceive. Thus, there is at least another pixel outside each region, having a feature vector significantly (i.e., perceptually) different from the original pixel at the center of the region, unless, of course, the image being considered is the non-interesting case where each pixel has substantially (i.e., perceptually) the same shade of the exact same color—that is, each pixel has substantially the same feature information.

A parent-child relationship is formed between two pixels if one pixel is within the other's perceptible disk, i.e., two pixels $(x_1, x_2)$ form a parent-child relationship if distance $(x_{1,2}) < \max (D_1, D_2)$ where $D_1, D_2$ are the disk sizes, respectively. A relationship graph among all pixels is then formed from the parent-child relationships. A node in the graph (a pixel) may have its children and parents. Three sets of pixels therefore exist in the graph: 1), root, or significant pixels (with no parent); 2) leaf pixels (with no child); and, 3) intermediate pixels (with both parents and children).

It is noted that in the hierarchical perception model used by embodiments of the invention, perception primarily comes from the root pixels. In other words, pixels are treated differently by assigning large weights to root pixels but zero weights to others. Note that the region (neighboring) information is preserved due to parent-child relationships between root pixels and other pixels. It is also noted that the understanding of an image comes from the relationship graph. Along the root pixels to the leaf pixels, a perceiving process is carried out from root pixels to their individual children and later generations hierarchically.

Figure 2:
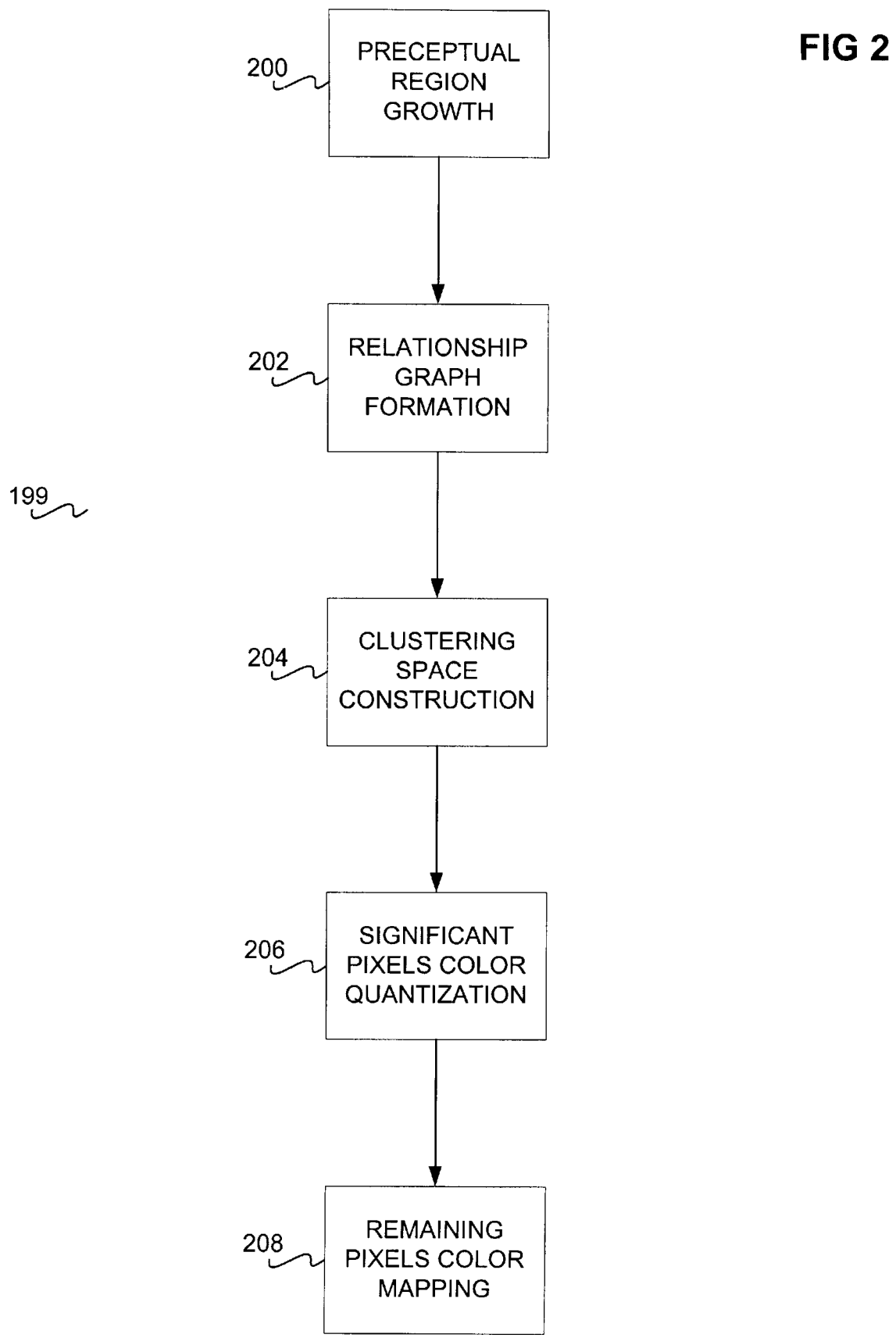
FIG. 2 is a flowchart of the manner by which a color image is quantized using a hierarchical perceptual model, according to an embodiment of the invention.

An overview of the manner by which a color image is quantized using a hierarchical color perception model, according to one embodiment of the invention, is now described. The overview is shown in the flowchart 199 of FIG. 2. In 200, perceptual region growth, based on multi-scale edge detection in one embodiment, is first performed. In 202, relationship graph formation is performed. In 204, clustering space construction is performed using the relationship graph, so that ultimately only a small number of colors is generated, but which is rich enough to represent the color vectors of the significant pixels. In 206, the significant pixels' colors are quantized; and, in 208 the remaining pixels' colors are mapped to the quantized colors. Each of 200, 202, 204, 206 and 208 is now described in turn in its own separate section of the detailed description.

Perceptible Region Growth Based on Multi-Scale Edge Detection

Figure 3:
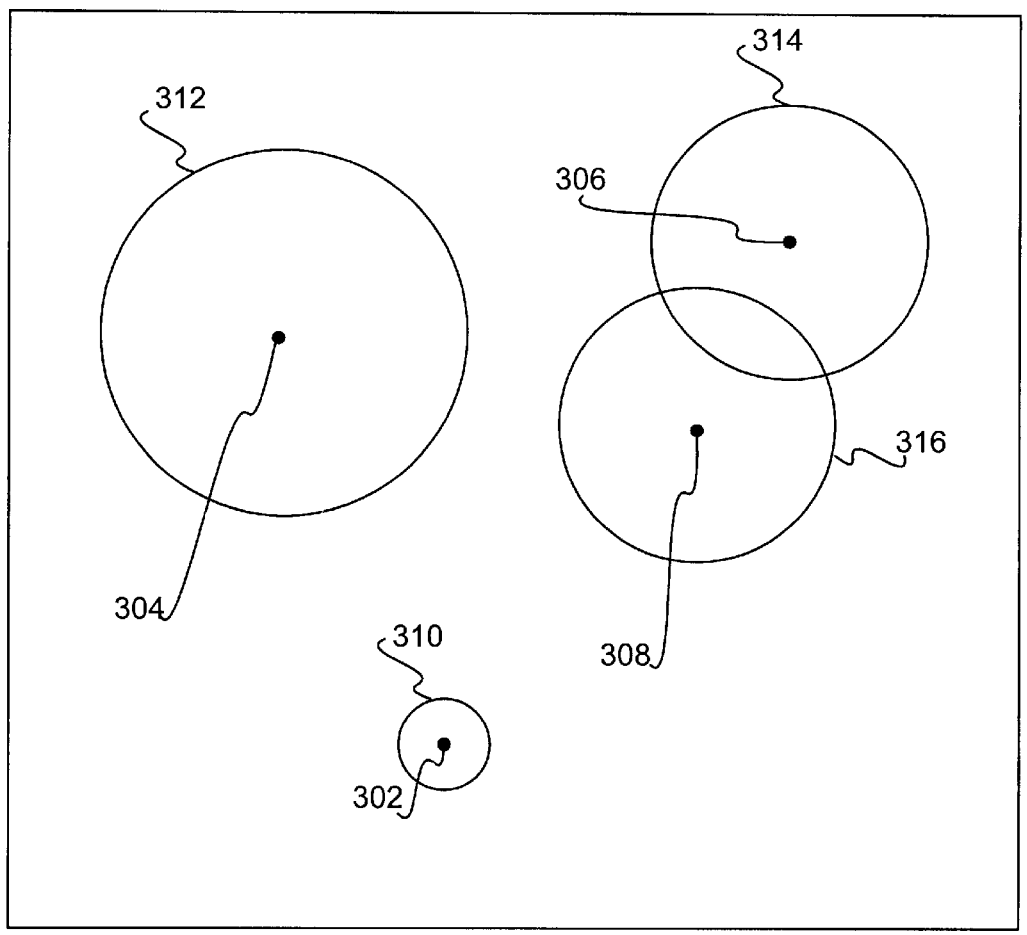
FIG. 3 is a diagram showing some pixels of a representative image and their perceptible regions, according to an embodiment of the invention.

In this section of the detailed description, perceptual region growth is specifically described, according to an embodiment of the invention. This growth is based on multi-scale edge detection in one embodiment. A:perceptual region, such as a disk, is grown for every pixel of an image. A diagram illustrating a few such perceptual regions for an example image is shown in FIG. 3. The image 300 has a plurality of pixels, including the pixels 302, 304, 306 and 308. Each pixel has a corresponding perceptual region, such as the regions 310, 312, 314 and 316, for the pixels 302, 304, 306 and 308, respectively. For purposes of illustrative clarity, not all the pixels of the image 300 are shown in FIG. 3, nor are all the regions of all the pixels of the image 300 shown in FIG. 3. It is noted that regions are typically of different size, and can and frequently do overlap with one another, such as regions 314 and 316 in FIG. 3.

Figure 4:
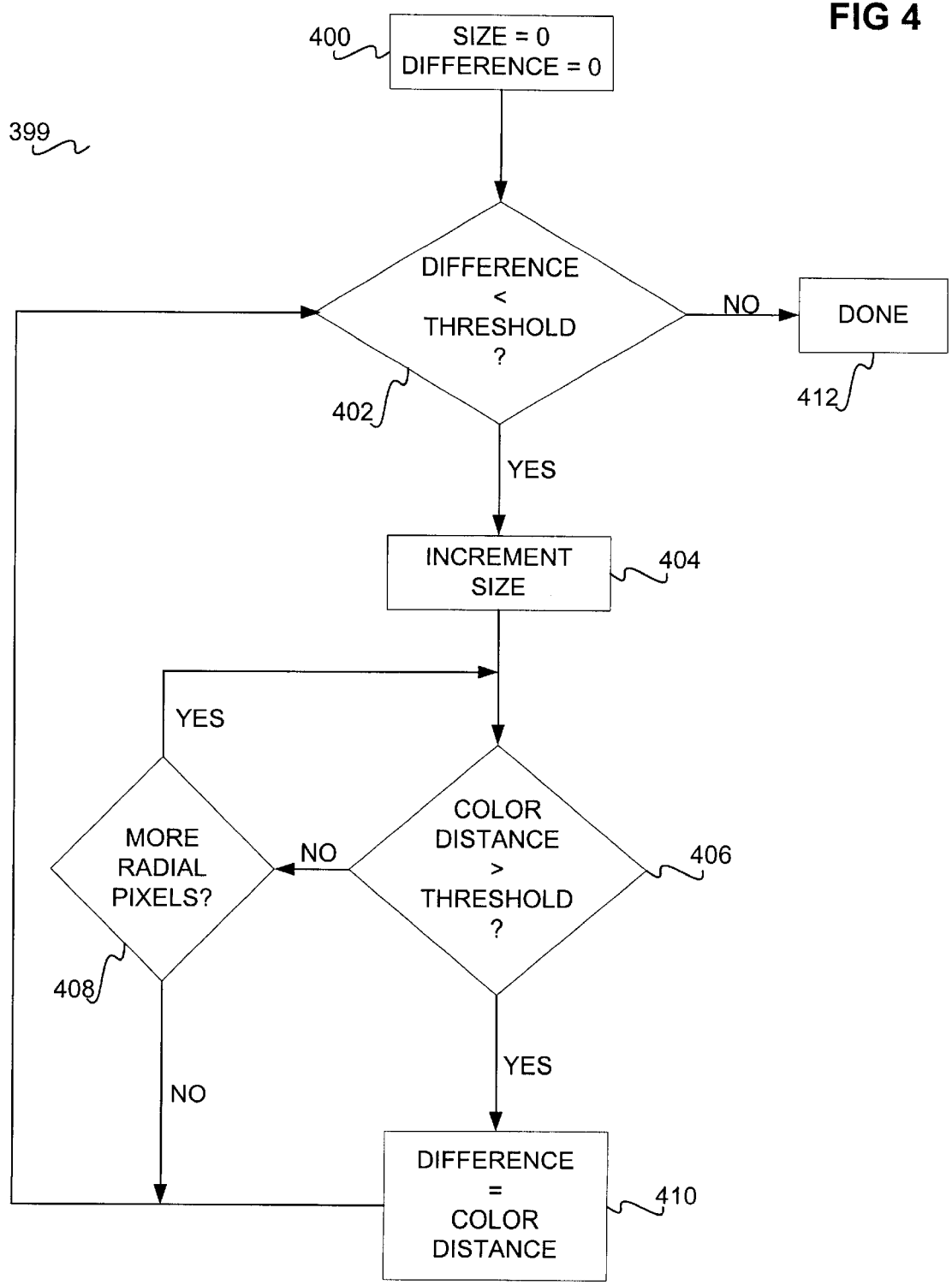
FIG. 4 is a flowchart showing how a perceptible region for a pixel can be grown, according to an embodiment of the invention.

In one embodiment, the perceptual region for each pixel is a disk, and is grown using disk expansion, where the size of the disk expands in radius from one pixel by one pixel, until the perceptual distance between the neighboring pixels and the original pixel at the disk center is greater than a predetermined threshold, corresponding in one embodiment to a minimum perceptible colors difference, as determined by human perception. A method for such disk expansion is shown in the flowchart 399 of FIG. 4, which is performed for each pixel of an image. In 400, the variables size and difference are reset to zero. The variable size corresponds to the radius of the disk from the pixel for which the method of FIG. 4 is being performed. The variable difference corresponds to the color difference between a pixel lying on the border of the disk—that is, where the distance between such a pixel and the center pixel is equal to the variable size—and the center pixel.

In 402, it is determined whether the variable difference is less than a predetermined threshold, which corresponds to the minimum perceptible color difference in one embodiment. Since during the first iteration through the method the variable difference is equal to zero, because the size of the disk itself is equal to zero, then the method proceeds to 404, where the size variable is incremented by one. Next, the pixels on the border of the disk are examined to determine if any of them has a color distance (viz., difference) from the central pixel greater than the predetermined threshold. If so, disk growth stops, otherwise it continues. Thus, for a first such pixel on the border of the disk, in 406, it is determined whether its color difference vis-a-vis the central pixel is greater than the threshold. If not, the method proceeds to 408, where if there are any more pixels on the border of the disk—also referred to as radial pixels—than the method returns to 406 for another pixel on the border.

When or if a pixel on the border is found that has a color distance greater than the threshold, then the method proceeds from 406 to 410, where the variable difference is set equal to this color distance. The method then proceeds back to 402 from 410. Note that the method also proceeds back to 402 from 408 when all the radial pixels have been examined. Thus, 402 is returned to in one of two scenarios: either the difference variable has been set to a color distance value greater than the threshold in 410, such that disk growth stops, and the method proceeds from 402 to 412, where the method ends; or, all the radial pixels have been examined, such that none has a color difference greater than the threshold, such that the method proceeds from 402 to 404 again, to continue growing the disk. Therefore, disk growth continues until a radial pixel is found at the border of the disk such that the predetermined color perception threshold has been exceeded.

In the method of FIG. 4, whenever the disk expands, the distance in color space between a pixel on the disk border and the original pixel must be determined prior to testing the condition in 406. Where none of these pixels has a color distance greater than the threshold, this means that the color distance for each pixel on the border is determined, which can result in slow disk expansion. Therefore, in another embodiment, the perceptible disks are not expanded directly, but rather, their edges are first detected in multiple scales, as known within the art, and as specifically described in the reference M. A. Brown, et al., "Multi-scale edge detection and feature-binding: an integrated approach," Pattern Recognition, Vol. 31, pages 1479–1490, 1998.

Using multi-scale edges, the expansion of the disk stops when the disk arrives at an appropriate edge. The appropriate edge is the first edge where the scale of this edge is less than the spatial distance between the disk center and this edge. Thus, distance determination is simplified by examining the edges and determining the spatial distance between edge pixels and the central pixel only. It is noted that in one embodiment, the threshold used for edge detection is the same as the minimum color difference used in the direct disk expansion method of FIG. 4.

Figure 5:
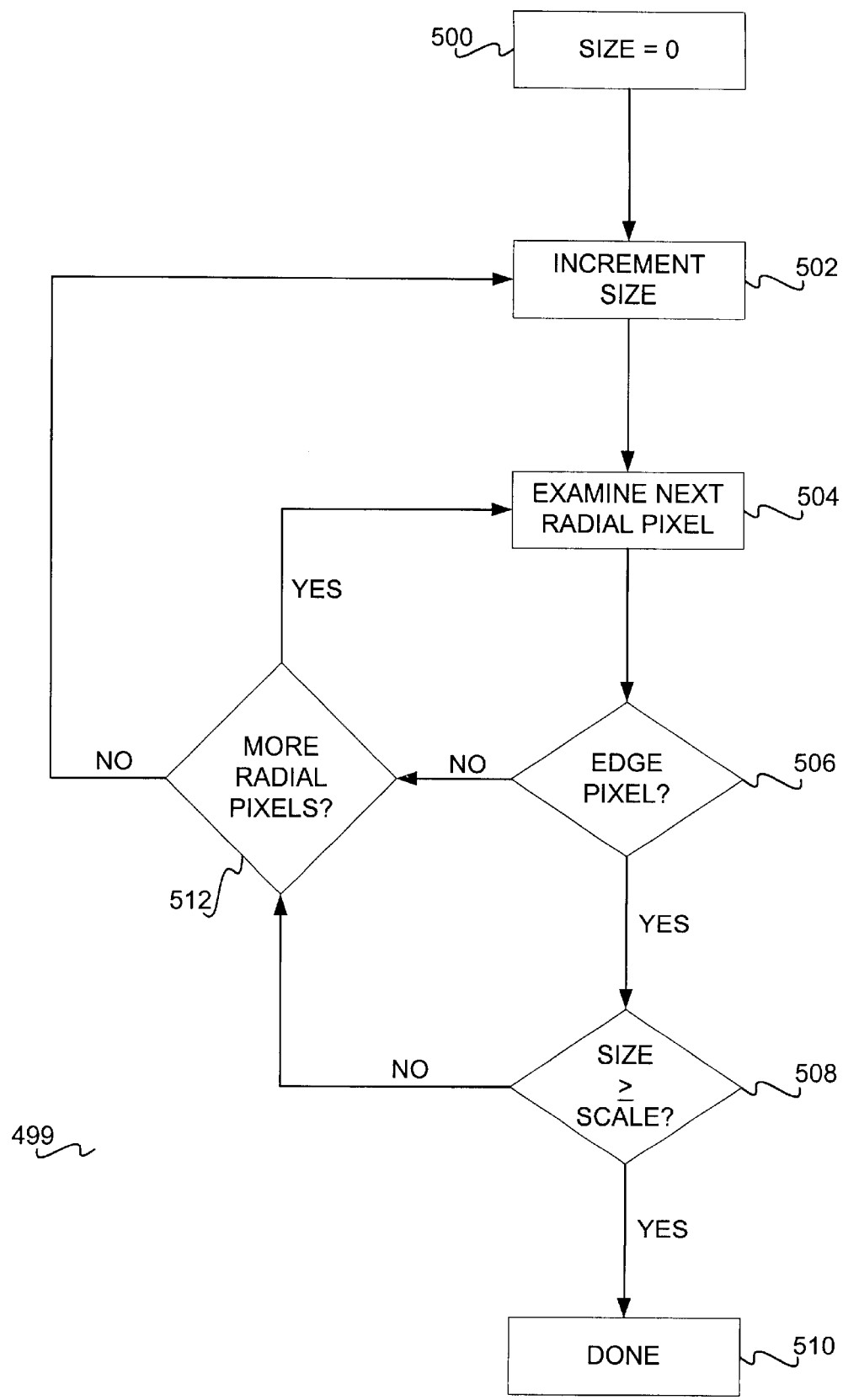
FIG. 5 is a flowchart showing how a perceptible region for a pixel can be grown using multi-scale edges, according to an embodiment of the invention.

The multi-scale edges approach is specifically shown in the method 499 of FIG. 5. In 500, the variable size, corresponding to the size of the perceptible disk being grown, is reset to zero. The variable size is then incremented by one in 502, and the next radial pixel—that is, the next pixel on the border of the disk—is examined in 504. In the case where the variable size has just been incremented, then this means that the first radial pixel is examined. If the pixel is an edge pixel, then the method proceeds from 506 to 508, where it is determined if the variable size is greater than or equal to the scale for this edge. If so, then the growth of the disk stops, and the method is finished in 510. However, if the size variable is not less than the scale for this edge, or if the pixel is not an edge pixel, then the method proceeds to 512 from 508, in the former case, or from 506, in the latter case. If there are more radial pixels to be examined, then the method proceeds back to 504, to examine the next radial pixel; once there are no more radial pixels to examine, the method proceeds back to 502, to again increment the variable size.

Figure 6:
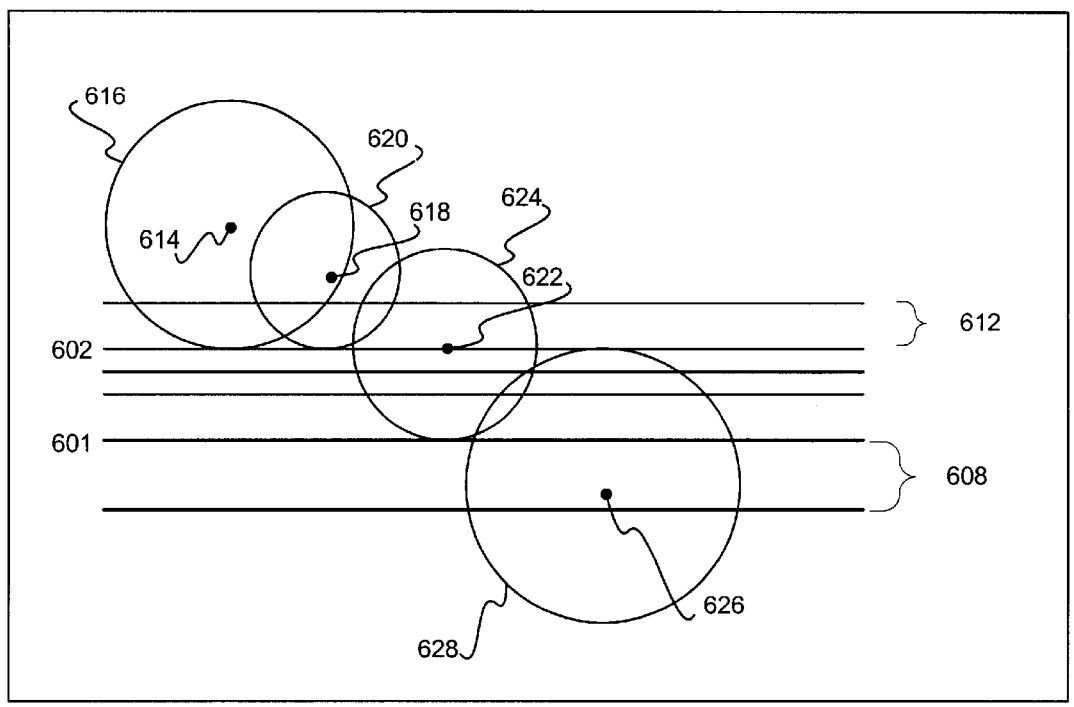
FIG. 6 is a diagram showing how the perceptible regions for some pixels of a representative image can be grown using multi-scale edges, according to an embodiment of the invention.
Figure 6:
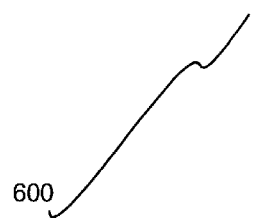

The diagram of FIG. 6 illustrates a representative example. In the image 600, there are two edges, 601 and 602, in two scales, 612 and 608, respectively. The perceptible disk 616 of the pixel 614 is such that its expansion is stopped at a pixel at the edge 602, because the distance from the pixel 614 to the edge 602 is greater than the scale 612. The perceptible disk 620 of the pixel 618 is also such that its expansion is stopped at a pixel at the edge 602, because the distance from the pixel 618 to the edge 602 is greater than the scale 612. For the disk 624 of the pixel 622, the expansion stops at the edge 601, not at the edge 602, because the distance from the pixel 622 to the edge 602 is less than the scale 612, but the distance from the pixel 622 to the edge 601 is less than the scale 608. Somewhat similarly, the perceptible disk 628 of the pixel 626, the expansion stops at the edge 602, not at the edge 601.

Relationship Graph Formation

In this section of the detailed description, the manner by which a relationship graph can be formed, using the perceptual regions of pixels, such as can be grown as described in the previous section of the detailed description, is described, according to one embodiment of the invention. An example relationship graph is first described for the representative image of the diagram of FIG. 7, which is for illustrative purposes only, and not meant to restrict or limit the invention itself In the image 700 of FIG. 7, there are four pixels, 702, 704, 706 and 708, that have perceptible disks 710, 712, 714 and 716, respectively. The relationship among the pixels of the image 700 is as follows. The pixel 706 is a single parent of the pixel 704, because the disk 714 of the pixel 706 overlaps with the disk 712 of the pixel 704, and the radius (or size) of the disk 714 is greater than the radius (or size) of the disk 712. The pixel 704 actually has two (multi) parents, both the pixel 704 and the pixel 702, because the disk 710 of the pixel 702 overlaps with and is greater in size than the disk 714 of the pixel 706. Furthermore, the pixel 708 is a parent of the pixel 702, and therefore is a grandparent (a hierarchical parent) of the pixel 704.

Figure 8:
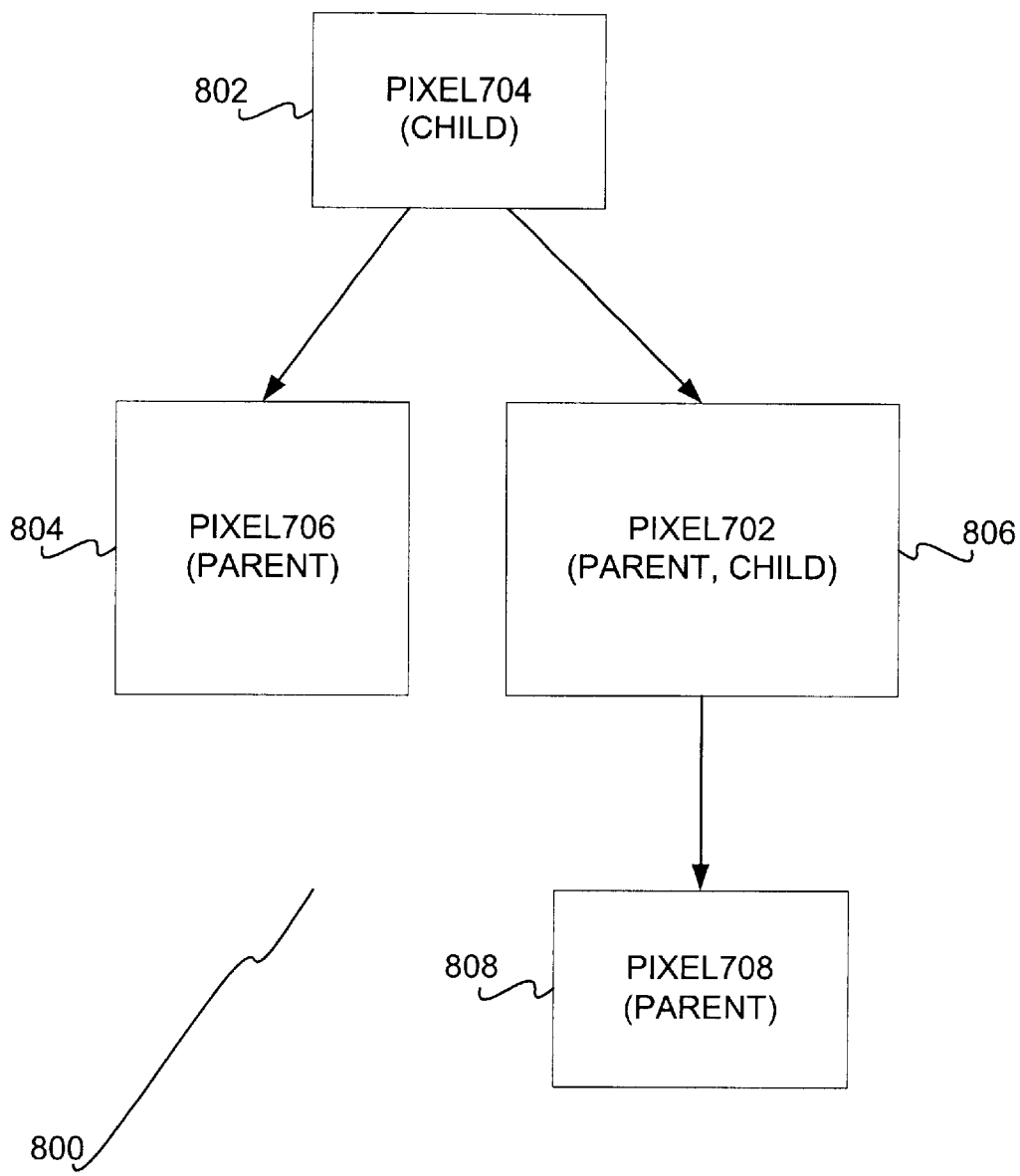
FIG. 8 is a diagram of a relationship graph showing the relationships among the pixels of the representative image of FIG. 7.

Therefore, the relationship among the pixels of the image 700 can be portrayed as a relationship graph, such as in the diagram of FIG. 8. In the relationship graph 800 of FIG. 8, the node 802 represents the pixel 704, which is a child of the pixels 706 and 702, such that the nodes 804 and 806 representing the pixels 706 and 702, respectively, are connected to the node 802 in a hierarchical manner.

Furthermore, the pixel 702 is a child of the pixel 708, and therefore the node 806 representing the pixel 702 is also shown as hierarchically connected to the node 808 that represents the pixel 708. Note that the parent-child relationship shown in the graph 800 is such that children nodes are listed higher in the graph as compared to parent nodes, which are listed lower in the graph, which is for illustrative purposes only.

Figure 9:
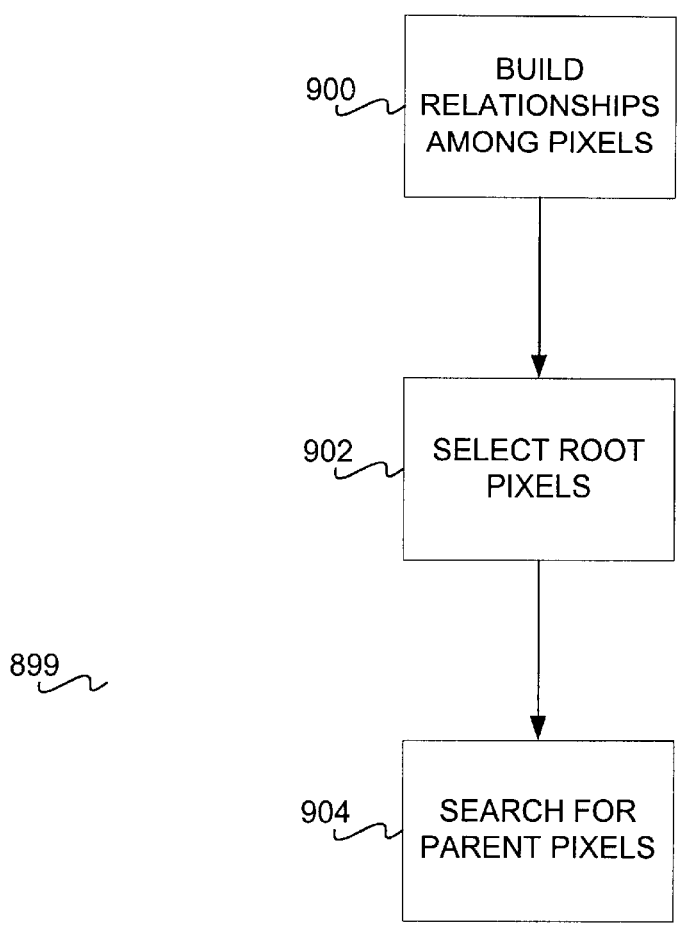
FIG. 9 is a flowchart of a method for building the relationships among the pixels of an image so that a relationship graph can be constructed therefrom, in accordance with one embodiment of the invention.

The invention is not particularly limited to the manner by which the relationship graph can be constructed. However, in one particular embodiment, the relationship graph is constructed as is now described, in conjunction with the method of the flowchart 899 of FIG. 9. The method of FIG. 9 specifically is for building the relationships among the pixels of an image, such that a relationship graph can be constructed therefrom. In 900, the relationships among all the pixels of an image are first built. Each pixel x has a perceptible region size s (x). Its parent's maximal disk size is s'(x). Then, for every other pixel $x_1$ with spatial distance $d_1$ from x, if $d_1 < s (x)$, and if $s (x_1) < s (x)$, then $s' (x_1) = s (x)$; but, for the same pixel $x_1$, if $s (x_1) > s (x)$, then $s' (x_1) = s (x_1)$.

Next, in 902, the root, or significant, pixels are selected, which are those pixels that have no parent pixels within the image. In one embodiment, this can be accomplished by noting that a pixel x belongs to the root set if $s' (x) = s (x)$. Finally, in 904, the set of all parent pixels is constructed by conducting a search for the parents. If a pixel x belongs to root pixel set, then it has no parents. Otherwise, each of its parent pixels $x_1$ must satisfy the following two conditions: 1) its spatial distance $d_1$ from x is less than the s' (x); and, 2), the distance $d_1$ less than s $(x_1)$. Once the method of FIG. 9 has been performed, the relationship graph for the pixels of an image can then be constructed using the resulting relationships.

Clustering Space Construction Using Relationship Graph

In this section of the detailed description, the clustering space construction, using a relationship graph as can be constructed as described in the preceding section of the detailed description, is described, in accordance with one embodiment of the invention. The clustering space is the set of pixels that will be clustered via their colors, using a clustering algorithm, to yield cluster centroids in which each pixel of the set belongs to one of the cluster centroids. In one embodiment, the clustering space is constructed simply as the set of root, or significant, pixels from the relationship graph. That is, the pixels in the relationship graph that have no other parents define the clustering space.

Significant (Root) Pixels Color Quantization

In this section of the detailed description, the manner by which significant, or root, pixels are quantized, in accordance with one embodiment of the invention, is described. That is, the clustering space, as can be constructed as described in the preceding section of the detailed description, is clustered by the colors of the pixels of the clustering space to yield cluster centroids, such that each root pixel belongs to one of the cluster centroids. The color of each root pixel is then mapped as the color of the cluster centroids in which it belongs.

In one embodiment, the k nearest neighbor clustering approach, as known within the art, is used to cluster the pixels of the clustering space by their colors. This in effect clusters the root pixels according to a reduced number of colors, where each cluster centroid resulting from the clustering approach has an associated color, as can be appreciated by those of ordinary skill within the art. Once the clustering has occurred, each root pixel is then mapped as the color of the cluster centroid in which it belongs. It is noted that the invention is not limited to a particular clustering approach, however. Other approaches besides k nearest neighbor that can be utilized include Parzen's approach.

Thus, significant pixel color quantization involves the construction of a color table by employing a clustering approach to generate centroids for the colors of the significant pixels. The set of all colors of the centroids is the color table, where each centroid, and thus one or more significant pixels, is mapped to a color. All the significant pixels are then mapped onto this color table in accordance with the centroid in which they reside. It is noted that the number of centroids depends generally on the minimum perceptible color difference as can be determined by human perception among the colors of the significant pixels.

The color table, therefore, provides the primary knowledge of the color content of an image. The clustering process is needed in one embodiment to generate this reduced number of colors, which is still rich enough to represent the color vectors of the root pixels. The process of mapping the root pixels to the color table quantizes them.

Remaining Pixels Color Mapping

In this section of the detailed description, the manner by which the remaining (i.e., non-root) pixels have their colors mapped onto the color table of the quantized colors of the significant pixels, as can be generated as described in the preceding section of the detailed description, is described, in accordance with one embodiment of the invention. Specifically, non-significant pixels are mapped onto the colors of their parents according to the color perception model. Each non-significant pixel has its color mapped so that its color is the same as its parent pixel. For non-significant pixels that have more than one immediate parent, their colors are mapped to the parent having the closer color distance from the quantized color of the parent to the non-quantized color of the non-significant pixel. In one embodiment, this can involve a multi-part process.

Figure 7:
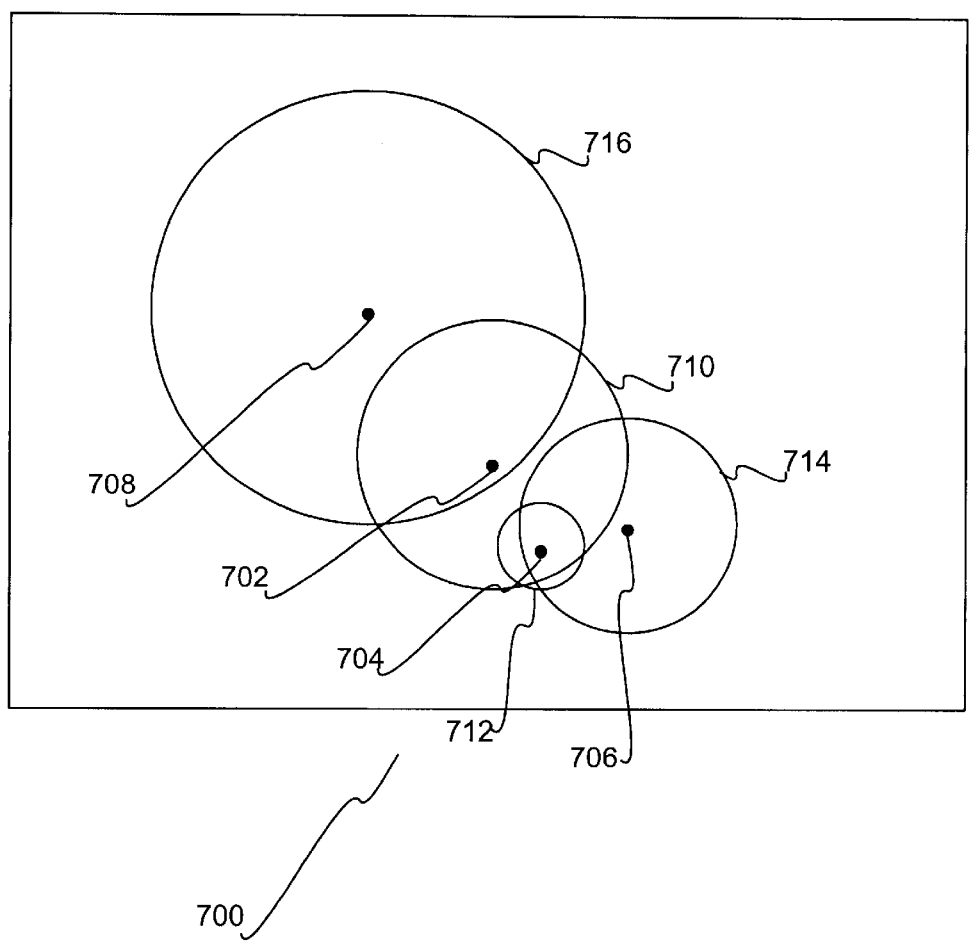
FIG. 7 is another diagram showing some pixels of a representative image and their perceptible regions, according to an embodiment of the invention.

For example, referring back to the representative image 700 of FIG. 7, the pixels 708 and 706 are root pixels, and therefore already have their color information. The pixel 702 is mapped onto the pixel 708, since the pixel 708 is the only parent of the pixel 702. However, the pixel 704 has two parent pixels, the pixel 706 and the pixel 702. Therefore, a comparison is made to determine which parent pixel is closer in color distance to the pixel 704—that is, the quantized color of the pixel 706, or the quantized color of the pixel 702. If the former, then the color of the pixel 704 is set equal to the quantized color of the pixel 706. If the latter, then the color of the pixel 704 is set equal to the quantized color of the pixel 702, which has already been set equal to the quantized color of its only parent, the pixel 708. Thus, for the pixel 704, which has multiple parents, a comparison is made in the color space to choose its nearest parent from a color perspective. Furthermore, because the pixel 704 has a multi-level relationship with one of its parents, the pixel 702 (which has a parent 708), the mapping process for the pixel 704 may be hierarchical.

Methods and Computers

In this section of the detailed description, methods and computers according to varying embodiments of the invention are described. In one embodiment, the methods can be computer-implemented methods. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 10:
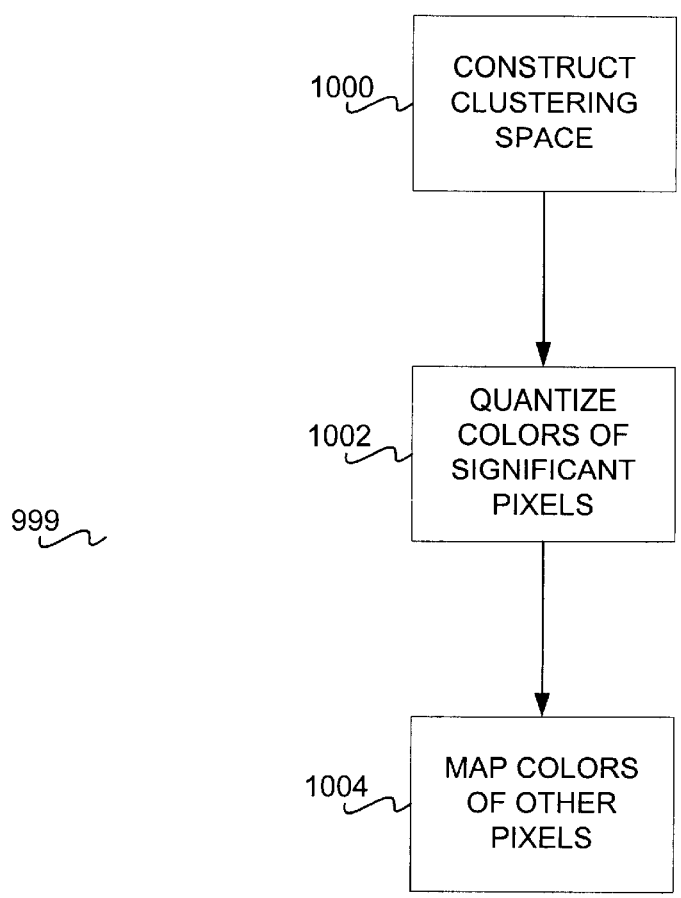
FIG. 10 is a flowchart of a method according to an embodiment of the invention.
Figure 11A:
FIGS. 11(a)–11(f) are screenshots showing the part-by-part transformation of an example original image to a color-quantized image, according to an embodiment of the invention.
Figure 11D:
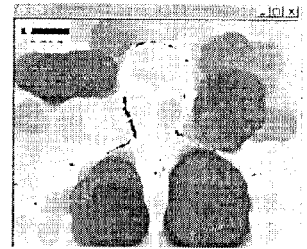
Figure 11B:
Figure 11E:
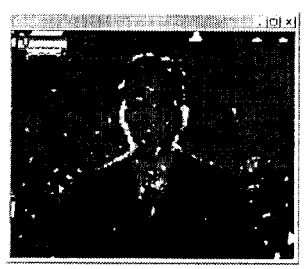
Figure 11C:
Figure 11F:
Figure 12A:
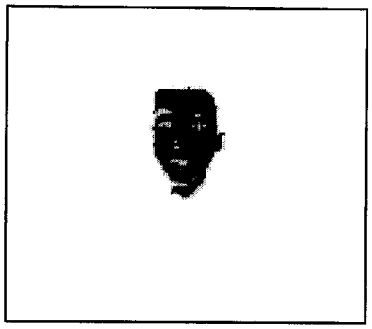
FIGS. 12(a)-12(f) are screenshots showing how a small number of colors provides higher-level object information of an example color-quantized image, according to an embodiment of the invention; and, FIG. 13 is a diagram of a computer according to one embodiment of the invention.
Figure 12B:
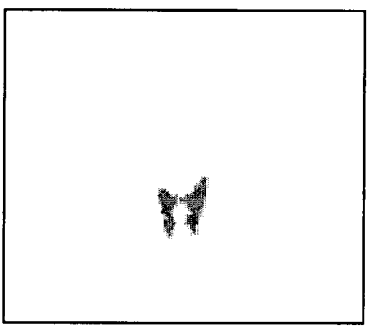
Figure 12C:
Figure 12D:
Figure 12E:
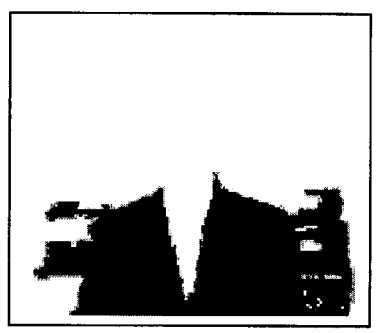
Figure 12F:

Referring now to FIG. 10, a flowchart 999 of a method according to an embodiment of the invention is shown. In 1000, a clustering space for an image is constructed, based on a color perception model. The clustering space includes a number of significant pixels selected from the pixels of the image. Each of the remaining pixels of the image, other than the significant pixels, has one or more parent pixels. The significant pixels do not have parent pixels.

In one embodiment, constructing the clustering space includes growing a perceptible color region for each pixel of the image, such as a perceptible color disk, and building a relationship graph of parent-child relationships of the pixels, based on the perceptible color regions of the pixels. The perceptible color regions can be grown using a multi-scale edges approach, in one embodiment. In one embodiment, building the relationship graph includes, for each pair of overlapping regions of two pixels, determining as the parent pixel the pixel having the larger of the two regions, such that the other pixel is the child pixel.

Next, in 1002, the colors of the image are quantized, based on the significant pixels of the clustering space. This can in one embodiment include employing a clustering approach, such as the k-means approach known within the art, to cluster the colors of the image to yield a color table with a reduced number of colors, such that each significant pixel resides in a cluster centroid resulting from the approach. The color assigned to the cluster centroid is then assigned as the quantized color for those significant pixels within that centroid. Thus, cluster centroids of significant colors are yielded from the colors of the significant pixels. It is noted that in one embodiment, colors as used herein is inclusive of shades of gray, black and white, etc.

Finally, in 1004, each of the pixels of the image other than the significant pixels are mapped to one of the quantized colors, specifically to the quantized color of its parent. Where a pixel has two or more parents, then the quantized color of that parent is selected for the pixel which is closest to the original color of the pixel. The image is then completely color quantized.

Figure 13:
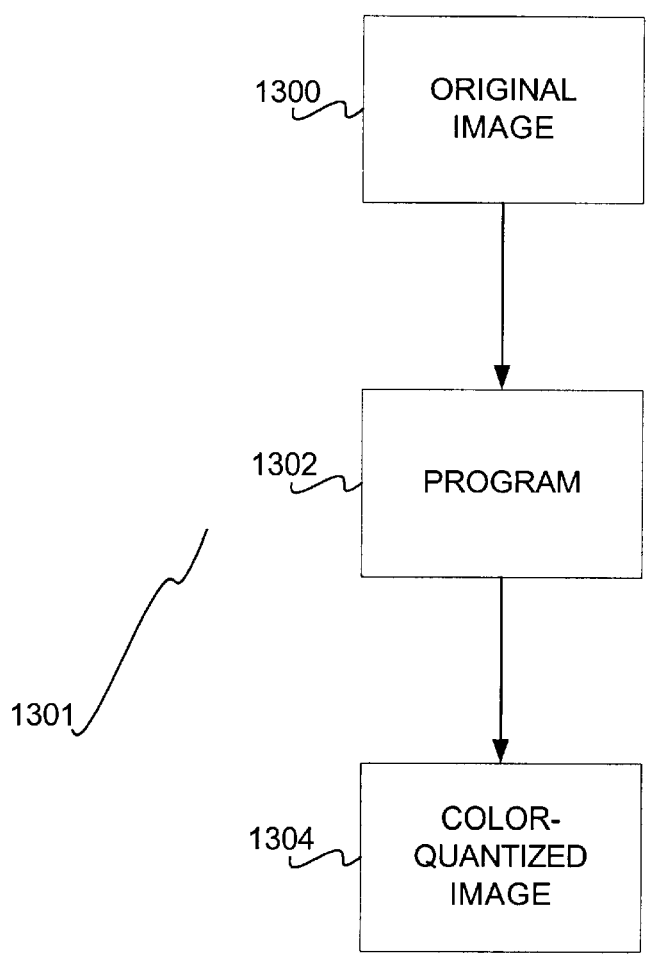

Referring next to FIG. 13, a diagram of a computer according to an embodiment of the invention is shown. The computer 1301 includes an original image 1300, a computer program 1302, and a color-quantized image 1304. Not shown in FIG. 13 is that the computer 1301 can include a computer-readable medium, such as a storage like a hard disk drive, a volatile memory, and/or a non-volatile memory, to have data stored thereon representing the images 1304. Furthermore, the computer 1301 can include a processor (not shown in FIG. 13), such that the program 1302 is executed from the medium thereby. The computer 1301 can in one embodiment correspond to the computer described in a preceding section of the detailed description in conjunction with FIG. 1.

The computer program is designed to generate the color-quantized image 1304 from the original image 1300, based on a hierarchical color perception model. Each of the images 1300 and 1304 has a number of pixels, each having a color value. However, the number of different color values of the image 1304 is markedly reduced as compared to those of the image 1300, as a result of the color quantization. In one embodiment, the program is design to generate the color-quantized image 1304 by constructing a clustering space of the image 1300 that has a number of significant pixels, quantizing colors of the image 1300 based on the significant pixels, and mapping pixels of the image other than the significant pixels to the colors as have been quantized. In one embodiment, this is accomplished as has been described in preceding sections of the detailed description. It is also noted that in one embodiment, the computer program 1302 can be considered the means for accomplishing this functionality.

EXAMPLE

In this section of the detailed description, screenshots of an example original image as it becomes color quantized, according to one embodiment of the invention, are shown. It is noted that the example presented in this section is for explanatory and illustrative purposes only, and is not meant to act as a limitation or a restriction on the invention itself. That is, the screenshots of this section are useful in showing how an embodiment of the invention operates as to an example original image.

The screenshot of FIG. 11($a$) shows an original image that has a large number of colors, specifically a television newscaster. After being subjected to an embodiment of the invention, a corresponding color-quantized image results, which is shown in the screenshot of FIG. 11($b$). It is noted that the screenshot of FIG. 11($b$) has only eleven colors, yet the detail of the television newscaster is still easily discernible. The resulting transformation to a color-quantized image means that the storage space required to store the image is considerably lessened; in addition, the amount of time necessary to transmit the image over a network is lessened as well.

The screenshot of FIG. 11($c$) shows the identification of the multi-scale edges of the original image of FIG. 11($a$). The screenshot of FIG. 11($d$) shows the color-perceptible regions after they have been grown. The screenshot of FIG. 11($e$) shows all the significant pixels of the original image, while the screenshot of FIG. 11($f$) shows these pixels after they have been quantized to a reduced number of cluster centroids. Once the remaining, non-significant pixels are mapped to one of the quantized colors, the resulting color-quantized image is the image that has already been shown in FIG. 11($b$).

It is noted that the color-quantized image of FIG. 11($b$), while reducing considerably the number of colors as compared to the original image of FIG. 11($a$), still conveys a significant amount of higher-level information regarding the perceptual objects within the original image. This is shown by reference to FIGS. 12($a$)–12($f$). In the screenshot of FIG. 12($a$), only those pixels of the color-quantized image in one of the colors is shown, yet one of the objects, the face of the newscaster, is easily discernible. Similarly, in the screenshot of FIG. 12($b$), the shirt of the newscaster is easily discernible, even though again only those pixels of the color-quantized image in one of the colors is shown. In the screenshot of FIG. 12($c$), a significant amount of the background is discernible, even when those pixels of the color-quantized image in one of the colors is shown. In the screenshots of FIGS. 12($d$) and 12($e$), the necktie of the newscaster and the coat of the newscaster, respectively, are easily discernible, although only pixels of a single color are shown. Finally, in the screen shot of FIG. 12($f$), nearly the complete background is discernible where only pixels of two colors are shown.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Therefore, it is manifestly intended that this invention be limited only by the following claims and equivalents thereof.

We claim:

1. A computer-implemented method comprising:

constructing a clustering space of an image having a plurality of pixels based on a color perception model, the clustering space comprising a plurality of significant pixels selected from the plurality of pixels of the image, such that each of the pixels of the image other than the significant pixels has at least one parent pixel;

quantizing colors of the image based on, for each significant pixel, the color of that significant pixel and the pixels of the image which have that significant pixel as a parent pixel; and, mapping each of the pixels of the image other than the significant pixels of the clustering space to one of the colors as quantized, selected from quantized colors of the at least one parent pixel of the pixel;

wherein constructing the clustering space comprises,
growing a perceptible color region of each pixel of the image, and,
building a relationship graph of parent-child relationships of the pixels based on the perceptible color regions of the pixels of the image.

2. The method of claim 1, wherein growing a perceptible color region comprises growing a perceptible color disk.

3. The method of claim 1, wherein growing a perceptible color region comprises employing a multi-scale edges approach.

4. The method of claim 1, wherein building a relationship graph of parent-child relationships comprises, for each pair of overlapping perceptible color regions of two pixels, determining that the region of the pixel having a greater size signifies the parent pixel of the two pixels, such that the other pixel is the child pixel.

5. The method of claim 1, wherein building a relationship graph of parent-child relationships comprises determining the significant pixels as the pixels having no parent pixels.

6. The method of claim 1, wherein quantizing colors of the image comprises employing a k-means approach.

7. The method of claim 1, wherein quantizing colors of the image comprises quantizing colors comprising shades of gray.

8. The method of claim 1, wherein mapping each of the pixels of the image other than the significant pixels to one of the colors as quantized comprises determining a quantized color for each pixel as a quantized color of a parent pixel closest to an original color of the pixel.

9. A computer-implemented method comprising:

constructing a clustering space of an image having a plurality of pixels based on a color perception model, the clustering space comprising a plurality of significant pixels selected from the plurality of pixels of the image, such that each of the pixels of the image other than the significant pixels has at least one parent pixel;

quantizing colors of the image based on, for each significant pixel, the color of that significant pixel and the pixels of the image which have that significant pixel as a parent pixel; and, mapping each of the pixels of the image other than the significant pixels of the clustering space to one of the colors as quantized, selected from quantized colors of the at least one parent pixel of the pixel;

wherein quantizing colors of the image comprises,
yielding cluster centroids of significant colors from colors of the significant pixels.

10. A machine-readable medium having instructions stored thereon for execution by a processor to perform a method comprising:

growing a perceptible color disk of each of a plurality of pixels of an image based on a color perception model;

building a relationship graph of parent-child relationships of the pixels based on the perceptible color disks of the pixels of the image;

determining a clustering space comprising a plurality of significant pixels as the pixels of the image having no parent pixels within the relationship graph;

quantizing colors of the image based on the significant pixels of the clustering space; and, mapping each of the pixels of the image other than the significant pixels of the clustering space to one of the colors as quantized, selected from quantized colors of at least one parent pixel of the pixel.

11. The medium of claim 10, wherein growing a perceptible color disk comprises employing a multi-scale edges approach.

12. The medium of claim 10, wherein building a relationship graph of parent-child relationships of the pixels comprises, for each pair of overlapping perceptible color disks of two pixels, determining that the disk of the pixel having a greater size signifies the parent pixel of the two pixels, such that the other pixels is the child pixel.

13. The medium of claim 10, wherein quantizing colors of the image comprises employing a k-means approach.

14. The medium of claim 10, wherein quantizing colors of the image comprises yielding cluster centroids of significant colors from colors of the significant pixels.

15. The medium of claim 10, wherein quantizing colors of the image comprises quantizing colors comprising shades of gray.

16. The medium of claim 10, wherein mapping each of the pixels of the image other than the significant pixels to one of the colors as quantized comprises determining a quantized color for each pixel as a quantized color of a parent pixel closest to an original color of the pixel.

* * * * *